C. A. MOSHER.
Farm-Gate.
No. 196,925. Patented Nov. 6, 1877.
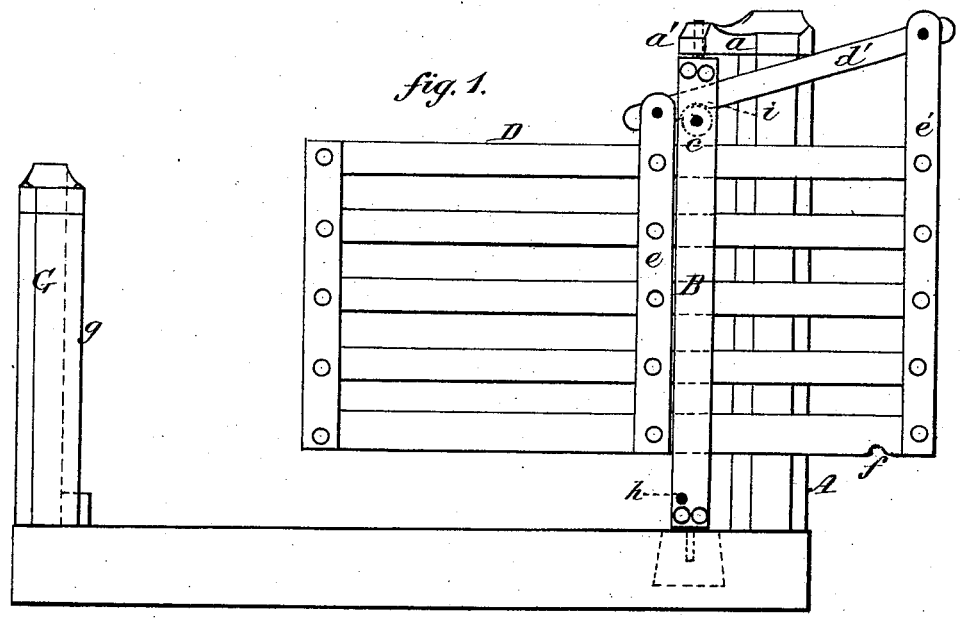
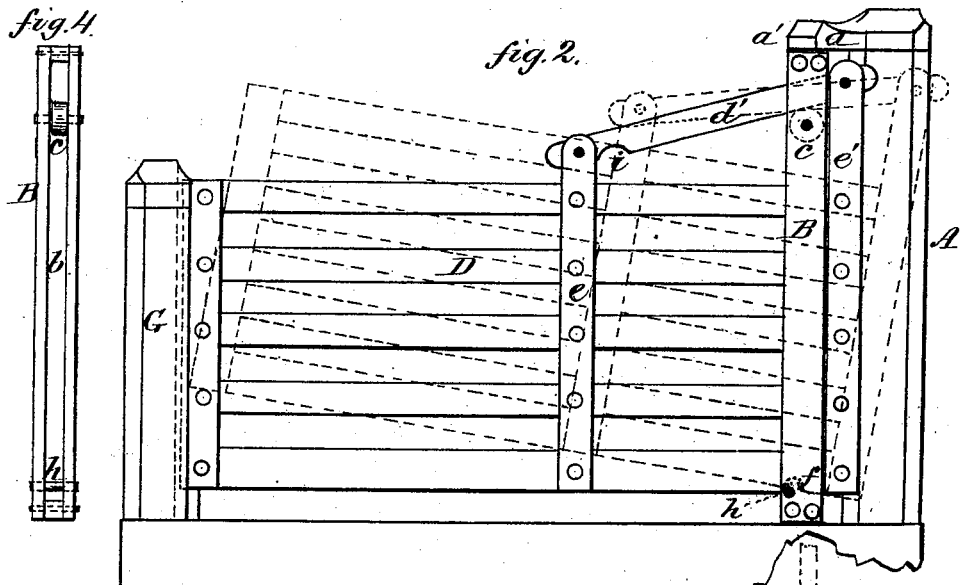
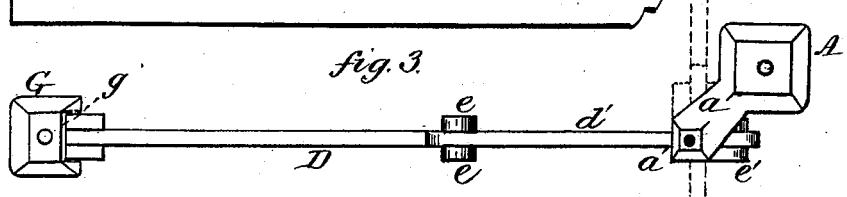
Witnesses: Inventor:
Floyd Norris Chas. A. Mosher
D. P. Cowl by Johnson & Johnson
Attys

UNITED STATES PATENT OFFICE.

CHARLES A. MOSHER, OF CASSOPOLIS, MICHIGAN.

IMPROVEMENT IN FARM-GATES.

Specification forming part of Letters Patent No. 196,925, dated November 6, 1877; application filed October 1, 1877.

*To all whom it may concern:*

Be it known that I, CHARLES A. MOSHER, of Cassopolis, in the county of Cass and State of Michigan, have invented certain new and useful Improvements in Farm-Gates; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists in so constructing a farm-gate that it may be partially opened for the passage of pedestrians, and raised to avoid snow and mud, by being slid longitudinally, and thus detained by an automatic detent, and may be then swung entirely open by the swiveling of a post, upon which it is supported; and, further, in a novel arrangement of devices by means of which said gate may be, when closed, automatically secured from both sliding and swinging.

In the drawings, Figure 1 represents my improved gate slid back or partially opened for the passage of pedestrians, and elevated to avoid snow and mud, and automatically held in such position. Fig. 2 shows, in full lines, the gate closed and secured, and, in dotted lines, the position to which the front end must be raised for unlocking and sliding it back. Fig. 3 is a top view, showing the grooved post, which prevents the gate from swinging when closed, and showing, also, in dotted lines, a partial view of the gate when swung entirely open; and Fig. 4, the slotted swiveling-post, showing the bottom holding-pin and top holding-roll for the gate.

In the drawing, A designates a vertical post, from the top of which an arm, $a$, extends obliquely toward the rear of the gate, and affords, in its outer end $a'$, a bearing for the top pivot of a slotted swiveling-post, B, the foot of which is pivoted in a suitable foundation fixed in the ground. Within and near the top of a vertical slot, $b$, in the swiveling-post, is arranged a transverse roller, $c$, and a transverse pin, $h$, is arranged between the walls of said slot, near its bottom. Between the walls of the slot $b$ plays the rear half of the gate D, which is composed of the usual horizontal rails, and has, in addition, an inclined top rail, $d'$, which extends from the tops of the middle tie-bars $e$ of the gate to the tops of the rear tie-bars $e'$, which are much higher than said middle tie-bars.

The inclined rail $d'$ passes through the slot $b$ above the roller $c$, and rests upon said roller, the other rails passing through said slot below the roller and above the transverse pin $h$. When the gate is closed, as shown in Fig. 2, a notch, $f$, in the rear end of the bottom rail of the gate catches on the transverse pin $h$, and prevents the gate from sliding backward until this notch is disengaged from said pin; and at the same time the front end of the gate fits in a vertical groove, $g$, in a post, G, and the gate is thereby prevented from swinging either inward or outward.

In order to unlock the gate the front end should be raised, as shown in dotted lines, Fig. 2, which moves inclined top rail $d'$ partially back on the roller $c$, and thus lifts the notch $f$ from its engagement with the transverse pin $h$. The gate may then be slid rearward (the inclined top rail guiding it obliquely upward on the roller $c$) until the middle tie-bars $e$ strike the swiveling-post B, and then the notch $i$, Fig. 2, in the under side of the front end of the inclined rail $d'$ catches over the roller $c$ and retains the gate open sufficiently for the passage of persons afoot, and raised clear of snow or mud, so that it may be swung entirely open, if desired, as shown in dotted lines, Fig. 3.

When it is desired to close the gate from the half-open position, (shown in Fig. 1,) the front end should be slightly depressed, for the purpose of drawing the notch $i$ of the inclined rail $d'$ away from the roller $c$, which it partially embraces, and then the gate slides downward and forward by gravity, and need only be guided to the groove in post G.

From the above description it will be seen that were it not for the notch $i$ in the inclined bar $d'$, which automatically holds the gate in position when half-opened or slid back against the swiveling-post, the said gate, when slid back and let go, would ride obliquely downward, guided by the said inclined rail on the roller $c$, and thus close, or nearly close, itself. Were it not for the notch $f$ catching upon pin $h$ when the gate is closed, the rooting of a hog or the rubbing of any animal against the gate might slide it rearward far enough to dislodge the front end from the groove $g$ in the post G, so that the gate could be forced either outward or inward; but the co-operation of the notch $f$ on its pin and the groove $g$ in retaining the front end of the gate effectually secures the said gate against being opened except by the exercise of human intelligence, and dispenses with the use of latches.

It will be understood that the oblique positions of the fixed and swiveling posts A and B, with respect to the gate, allows the rear part of the latter to be slid back by the post A, and then the gate to be swung open at right angles to its sliding position.

I claim—

1. The detaining-notch $i$ in the inclined top bar $d'$ of the gate, in combination with the roll $c$ in the swiveling-post B, substantially as herein set forth.

2. The combination of the grooved post G, gate D, having notch $f$ in its bottom rail, and post B, having transverse pin $h$, substantially as described.

3. The longitudinally-sliding gate D, having notch $f$ in the rear end of one of its rails, in combination with a supporting-post provided with a transverse rod or pin projecting therefrom in the path of said notch.

4. The combination, with a longitudinally-sliding gate, of a post having a vertical groove for the reception and support of the front end thereof, and a securing device in the swiveling-post, whereby the gate is held from being swung open or slid back.

In testimony that I claim the foregoing I have affixed my signature in the presence of two witnesses.

CHARLES A. MOSHER.

Witnesses:
M. L. HOWELL,
G. B. SWEENEY.